Sheet 1-2 Sheets.

L. D. Philips.
Grain Binder.

Nº 18988   Patented Dec. 29, 1857.

Inventor

L. D. Phillips

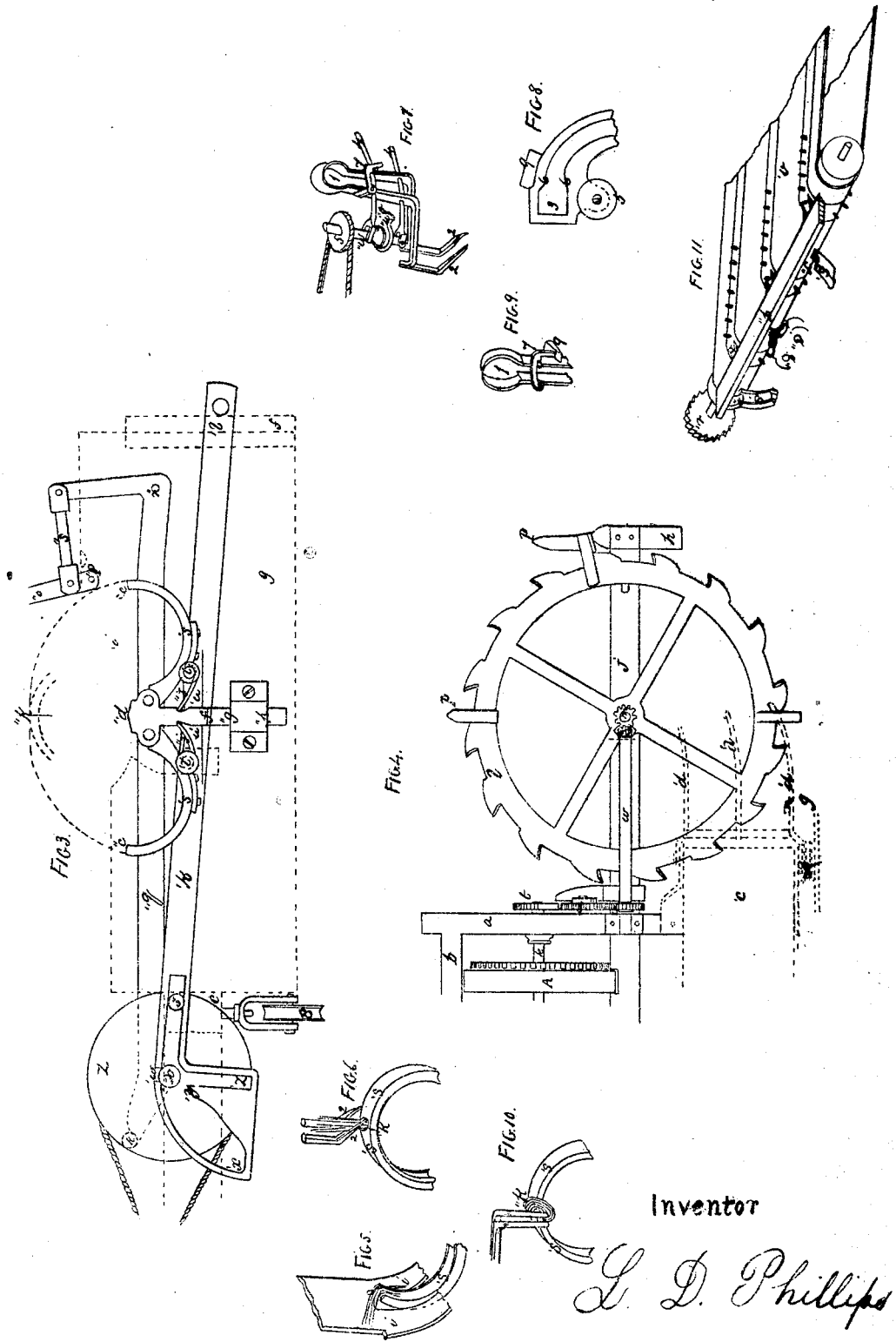

UNITED STATES PATENT OFFICE.

L. D. PHILLIPS, OF CHICAGO, ILLINOIS.

IMPROVEMENT IN MACHINES FOR BINDING GRAIN.

Specification forming part of Letters Patent No. 18,988, dated December 29, 1857.

*To all whom it may concern:*

Be it known that I, LODNER D. PHILLIPS, of the city of Chicago, in the county of Cook and State of Illinois, have invented a new and useful Machine for Reaping, Gathering, and Binding or Harvesting Grain; and I do hereby declare that the following is a full and exact description thereof, reference being had to the accompanying drawings, and to the letters of reference marked thereon.

The nature of my invention consists in certain improvements in machines for binding grain.

To enable others skilled in the art to make and use my invention, I will proceed to describe its construction and operation.

Figure 1:
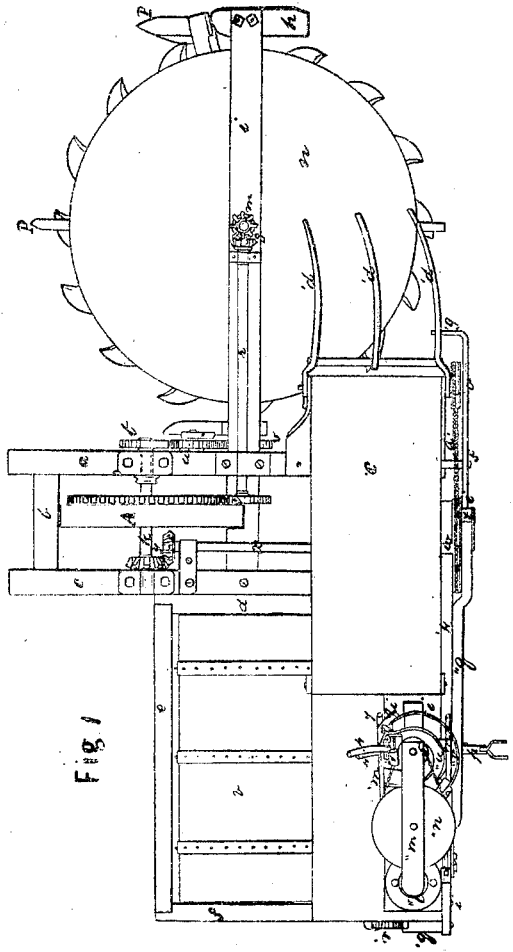
Figure 2:
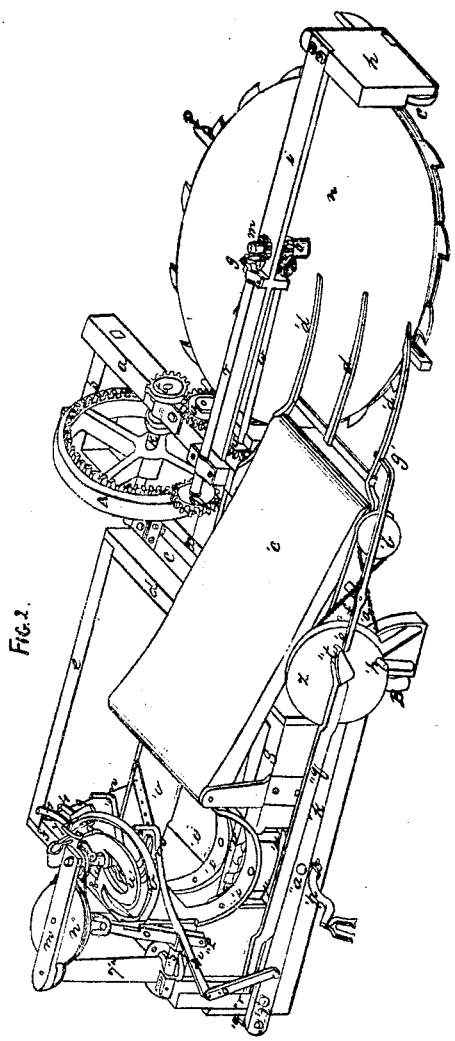

The drawing marked Figure 1 represents a plan or top view of the machine; Fig. 2, a perspective view; Figs. 3, 5, 6, 7, 8, 9, 10, detached parts of the binding apparatus. Fig. 4 shows the manner of arranging the gearing to give motion to the revolving platforms.

First, I construct a strong frame, as shown at $a\ b\ c$, forming the principal carriage of the gears and shafts. I then construct a strong box, formed by the side pieces $d\ e\ f\ g$, and secure it to the side $c$ of the carriage. I then arrange a frame or solid block at $h$, and connect it with the carriage $a\ b\ c$ by means of bars of wood or metal, as shown at $i$, on Figs. 1 and 2, being the upper bar, and $j$, on Fig. 4, being the lower bar. The whole machine rests on three wheels, namely, the driving-wheel A, the axle of which, marked $k$, passes through suitable boxes attached to the side pieces $a$ and $c$ of the carriage. The second supporting-wheel is shown at B, on Figs. 2 and 3, and is attached to the under side of the carriage $c$, as shown on Fig. 3. The third wheel is shown at C, and has its axle attached to the frame or block $h$. The revolving disk or cutter is shown at $l$. The axis of this cutter is an upright spindle, shown at $m$, the lower end resting in a socket on the bar $j$, the spindle passing upward through the hollow shaft $o$, supported by the upper bar $i$. The revolving platform $n$ is attached to the hollow shaft $o$. The fingers $p$, any number of them, are secured to a circular rim lying directly under the disk or cutter $l$, the rim being secured to the bar $j$. The side of the driving-wheel A is furnished with a cogged wheel, which gears into the pinion $q$, which is fixed on the shaft $r$. There is also a beveled pinion on shaft $r$, as shown at $s$, which gears into a similar pinion on shaft $m$. I then fix a spur-geared wheel on the end of main shaft $k$, as shown at $t$, having teeth or cogs on one-half of its periphery, the other being reduced in diameter to the base of the teeth or cogs. $u$ represents an intermediate spur-geared wheel, which is geared into a similar wheel, $v$, fixed on shaft $w$. Also, on the opposite end of shaft $w$ I fix a bevel-wheel, which is geared to a similar beveled wheel fixed to the hollow shaft $o$. The operation of this part of the machine is as follows: The driving-wheel A being made to revolve, the pinion $q$ gives motion to shaft $r$ and pinion $s$, which revolves the shaft $m$, which, being attached to the disk or cutter $l$, causes said cutter to revolve with a rapid motion. At the same time the wheel $t$ is made to revolve, and during half its revolution is in gear with the wheel $u$, and during the other half of its revolution the wheel $u$ remains stationary. The wheel $u$ gives motion to the wheel $v$, which revolves the shaft $w$, which, by bevel-wheels, gives motion to shaft $o$ and platform $n$; consequently, the platform $n$ is put in motion during one-half revolution of driving-wheel A, and remains at rest during the other half revolution of said wheel. I then arrange a shaft, $x$, fitted in suitable boxes attached to the side $c$ of the frame. I communicate motion from the main shaft $k$ to the shaft $x$ by the beveled wheels $y$. I then fix a pulley, $z$, on the end of shaft $x$. This pulley being furnished with belt $'a$, gives motion to the pulley $'b$, which revolves a cylinder suspended from side $a$ of the carriage. This cylinder gives motion to the conveyer or endless apron $'c$. $'d\ 'd\ 'd$ is the rake or gatherer. The points of the prongs may rest, if desired, in circular grooves in the platform $n$. $'e\ 'f\ 'g$ represents a lever, having its fulcrum on a pivot at $'f$. The end of this lever, at $'g$, is crooked, so as to pass under one of the prongs of the gatherer $'d$. I fix a pin in the side of the pulley $z$, at $'h$. This pin comes in contact with the upper edge of the lever at $'e$, which elevates the prongs of the gatherer, so that the gathered stalks fall upon the apron $'c$, which conveys and deposits them in the concave receiver $'i$ $'i$ $'i$. They are now in position for binding. I place a pin or wrist on the inside face of the pulley $z$, as shown at $'j$, Fig. 3. This pin moves in the slots of the lever $'k$. This lever has its fulcrum on a pin at $'l$. $'m$ $'m$ are two compression-levers, connected by a cross-bar at $'n$, which also forms the pivot or fulcrum of the levers. One of these levers is attached to the lever $k'$ by the connecting-rod $'o$. When the pin $'j$ raises the lever $k'$, the levers $'m$ $'m$ are depressed downward on the grain or stalks deposited in the receivers $'i$ $'i$. The wrist $'j$, Fig. 3, being at the highest point of the pulley $z$, passes across the opening $'w$, (which is smaller than the diameter of the wrist $'j$.) The wrist now descends along the circular part of the slot, which is concentric with the pulley $z$, until the wrist arrives at the point $'x$, the lever $'k$ remaining stationary during this quarter-revolution of pulley $z$, holding the levers $'m$ $'m$ tightly compressed on the gavel, giving the binding apparatus time to perform its office. The next quarter of a revolution the wrist passes from $'x$ to $'y$, thus depressing the lever $'k$ through the entire diameter of pulley $z$, the shaft $x$ passing out through the opening $'w$. When the lever $'k$ is elevated the shaft $x$ passes into the slot $'z$. $'p$ is a short crooked-handled pitchfork, the lower end pivoted and secured to the side $g$ of the box. A loop or staple is attached to lever $'k$, through which the handle passes. The fork is attached by a joint or pivot to the upper end of the handle. When the lever $'k$ is being elevated, the loop draws the fork inward and upward until it comes in contact with the bundle or sheaf lying in the concave $'i$ $'i$. The descent of lever $'k$ throws the fork outward, which dislodges the sheaf and throws it upon the ground in rear of the machine. The bottom of the box $d\ e\ f\ g$ is formed by an inclined endless apron, as shown at $'v$. I fix three endless belts or straps to said apron, and attach short pins or studs to the straps at such distances apart that as many straws as lie between each set of pins shall be sufficient for one band. This apron is moved by the hand $'q$ attached to the end of the lever $'k$, and falling in proper notches in the ratchet-wheel $'r$. This ratchet is attached to the cylinder of the revolving apron $'v$, and moves said apron a distance equal to the space between the pins or studs at each revolution of the pulley $z$. I then place a quantity of straw in the box $d\ e\ f\ g$, the straw resting on the apron $'v$, the stalks to be laid parallel to the sides $e$ and $g$ of the box. Therefore, the straws forming a band are measured by the height of the pins and their distance apart. At each motion of the apron $'v$ a band of these straws falls over the edge of the board $''b$ (see Fig. 11) and rests on the points $''c$ $''d$ $''e$, Fig. 3, a half circle being cut out at each point to receive the band. Also, the upper concave surface of the arms $'s$ $'s$ is hollowed or grooved semicircularly to conform to the band as it is passed around the sheaf. $'t$ $'t$ are two wrists fixed to the cross-head $'u$ $'u$. This cross-head is attached to the lever $'k$ by the pin $''a$. $''d$ $''f$ $''g$ $''h$ represents a piston sliding in the box $''g$ $''h$. This piston has a collar at $''f$ and $''h$. The arms $'s$ $'s$ are pivoted to the piston at $''i$ $''i$. The upward motion of the wrists $'t$ $'t$, pressing against the arms $'s$ $'s$, causes the piston to slide through the box until the collar $''h$ comes in contact with the box; the wrists $'t$ $'t$ continuing upward, cause the arms $'s$ $'s$ to revolve on the pivots $''i$ $''i$ until the points $''c$ $''e$ come together at $''k$. The arms, in performing this motion, pass through the slot in the concave $i\ i$, the ends of the arms passing so near the ends of the slot that the straws forming the band are crimped at right angles, as shown at Fig. 5, and when the ends of the arms come in contact, the two ends of the band stand vertical, as shown at Fig. 6. The arms now encircle the sheaf or gavel, and having passed the band around it, the ends of the band are twisted and tucked under itself by the following-described machine and motions: $''l$ is a pillar firmly secured to a platform attached to the sides $f\ g$ of the box. $''m$ is a bar placed horizontal and fixed to the top of pillar $''l$. I then arrange the horizontal pulley $''n$, having its axis pivoted in the bar $''m$, and the lower end resting in a step in the platform. I then attach a pin to the under side of pulley $''n$, and extend it outward until it rests in the clutch formed in the upper end of the lever $''o$. This lever works on a pivot at $''p$. I then arrange a lever, marked $''q$, having its fulcrum on a pivot at $''r$. This lever is bent at its fulcrum at nearly right angles, and is connected with lever $''o$ by the connecting-rod $''s$. The pin $'h$ on pulley $z$ comes in contact with the under side of lever $''q$ and elevates the lever until the pin passes into the inclined slot $''t$, fixed on the end of lever $''q$, which depresses the lever to its first position. I then arrange an inclined eccentric slotted guide of metal, firmly bolted to the upright end of the concave $i\ i$. This guide is shown at $''u$ $''v$, on Figs. 1 and 2. The slot in this guide forms a spiral about the shaft $''w$. The upper surface of the guide is horizontal from the point $''v$ to the left, and inclined upward from the point $''v$ to the right. I then arrange a pair of tongs, or nippers, as shown at Fig. 7, where number 1 represents a bow-spring; 2 2, the points of the tongs. The spring tends to separate the points. The tongs pass along in the slot formed in the guide $''u$ $''v$. When at the upper end, as shown at Fig. 2, the spring opens the tongs so as to fill the increased width of the slot at 3, on Fig. 8. The tongs are moved along the slot by the bars 4 4, which are attached by pivots to the shaft $''w$. The shaft $''w$ has a pulley fixed, as shown at 5. A band is passed around pulleys $''n$ and 5. The upward and downward motion of the lever $''q$ revolves the pulley $''n$ forward and backward, which, by the belt, gives a similar motion to the shaft $''w$; therefore the bars 4 4 force the tongs along the spiral slot in the guide $''u$ $''v$. The tongs immediately come in contact with the narrow part of the slot 6 6, as shown on Fig. 8, which closes the points 2 2. The tongs are held in this position by the latch 7. This latch is raised at the lower end of the slot by an inclined plane, shown at 8, on Fig. 2, which allows the points 2 2 to separate. Again, on the return of the tongs to the upper end of the slot, they are closed, and the latch is again released by another inclined plane, shown at 9. Therefore, the operation of binding is such that, the arms $'s$ $'s$ being in contact, as shown at Fig. 6, the two ends of the band standing upright and together, held in the semicircular indentation in the end of each arm, at the first motion of the tongs the points close tightly upon the projecting ends of the band and, passing down the slot, the band is twisted and the end tucked under, as shown at Fig. 10 ; the arms $'s$ $'s$ then fall back, the elasticity of the sheaf tightens the band, and the points 2 2 separate by the latch releasing the spring as it passes the inclined plane at 8.

What I claim as my invention, and desire to secure by Letters Patent, is—

1. The circular revolving platform $n$, in combination with the rake $'d$ $'d$ $'d$ and apron $'c$, for the purpose of gathering the grain and conveying it to the binding-receiver $'i$ $'i$ $'i$.

2. The peculiar construction and combination of the grooved arms $'s$ $'s$ with the slotted lever $'k$, for the purpose of carrying and crimping the band and compressing the stalks in proper shape for binding.

3. The construction and arrangement of the apron with straps and pins $'v$, in combination with the box $d$ $e$ $f$ $g$, for the purpose of feeding the binding-clamps with bands taken from the mass of straw placed in said box one at a time.

LODNER D. PHILLIPS.

In presence of—
 B. HENDRICKS,
 J. A. HOISINGTON.